Figure 1:
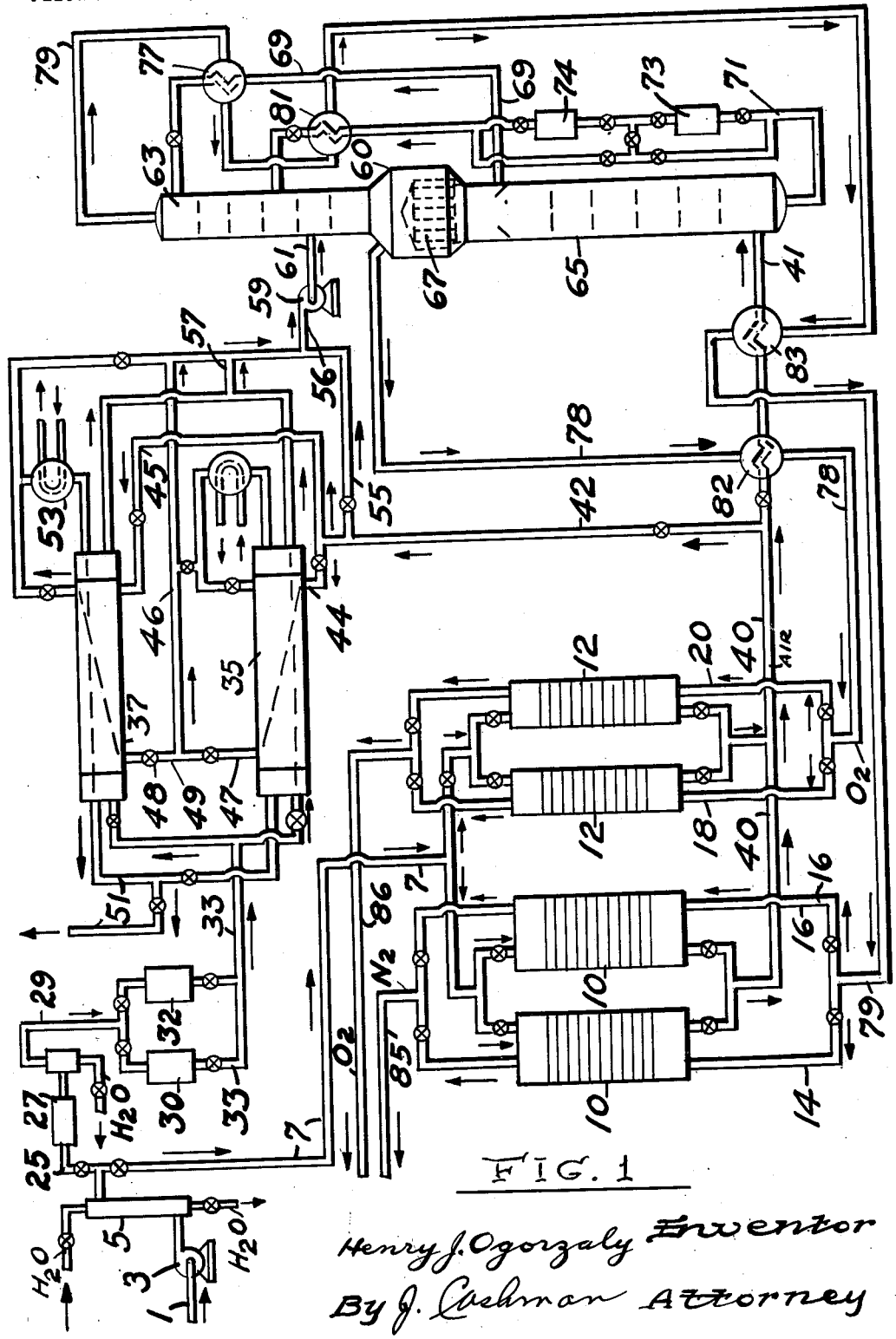

Henry J. Ogorzaly Inventor
By J. Cushman Attorney

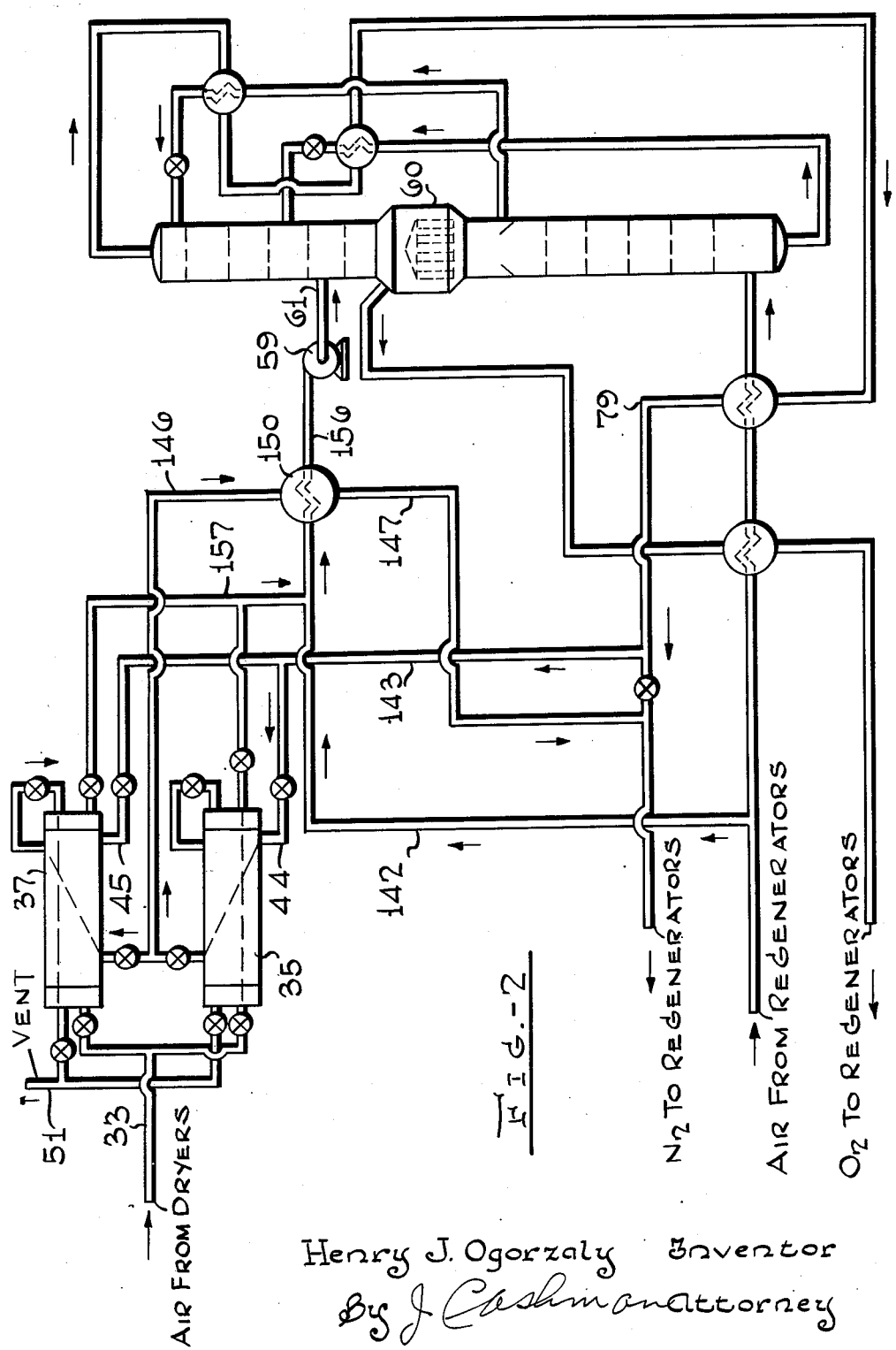

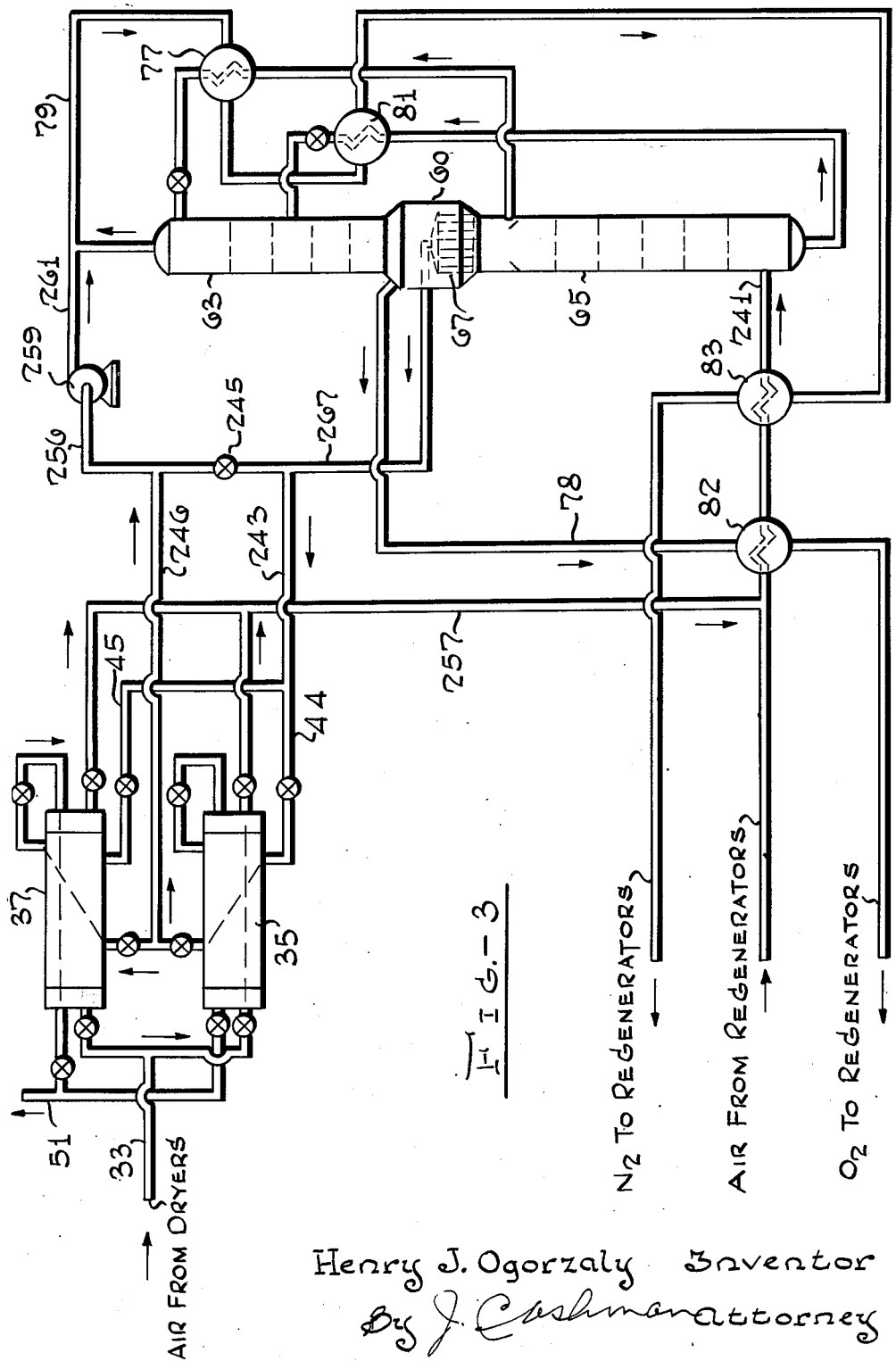

Patented Dec. 23, 1952

2,622,416

UNITED STATES PATENT OFFICE 2,622,416

SEPARATION OF LOW BOILING GAS MIXTURES

Henry J. Ogorzaly, Summit, N. J., assignor to Standard Oil Development Company, a corporation of Delaware Application March 30, 1949, Serial No. 84,315

14 Claims. (Cl. 62—175.5)

The present invention relates to a process for separating gas mixtures containing constituents of different boiling points and to the removal from such gas mixtures of constituents which tend to solidify at the conditions of the separation process. More particularly, the invention is concerned with the separation of air into nitrogen and oxygen and involves preventing the entry of water and $CO_2$ into the separation means by solidification from the inlet streams and revaporization into the exit streams.

The separation of gas mixtures containing low boiling constituents, such as air, into their principal components by conventional low temperature liquefaction methods involves as one of its major difficulties the deposition of ice, solid carbon dioxide or other comparatively high freezing point minor gas constituents in the countercurrent heat exchangers used to cool the incoming gas to temperatures suitable for subsequent fractionation into its principal components. In the absence of special provision for their removal, these deposits of frozen water and carbon dioxide very rapidly plug up the gas passages of the heat exchangers which have, therefore, to be thawed out after relatively short operating periods even if the gas mixtures have been previously partially purified by suitable chemical treatments. The accumulation of such deposits may be prevented by the use of heat exchange equipment employing an alternation of flow paths to effect the cooling of the inlet gas, in a manner well known in the art of air separation. For this purpose, switching regenerators have been used which are kept in operating condition by the periodic revaporization of deposited ice and $CO_2$ snow into low pressure streams of oxygen and nitrogen produced in the process itself and passed during the cold storage cycle through the passages of the regenerators through which, in a previously air cooling cycle, the air has been passed depositing its water and $CO_2$ in solid form. In this manner, the ice and solid $CO_2$ evaporate into the low pressure product streams while simultaneously the heat absorbed in the regenerators during the chilling of the air to operating temperatures in the previous cycle is removed by transfer to the product streams. Recuperative-type heat exchangers may be used in a similar manner.

In order to permit the removal of ice and solid $CO_2$ from the alternating regenerators in the manner indicated, the mass or weight of low pressure product gas which is passed over the surface supporting the deposited ice and $CO_2$ must be greater than the mass of air from the ice and $CO_2$ to be removed was previously deposited. The reason for this requirement is the fact that the low pressure gas has a smaller heat capacity per unit mass than the air introduced at a relatively high pressure. With equal flow quantities of low pressure product gases and high pressure air, this difference in heat capacity results in excessive temperature differentials in the colder parts of the apparatus which prevent the successful removal of the deposited ice and $CO_2$. The required difference between the quantity of air from which the solid impurities are deposited and the quantity of low pressure gas required for the removal of these deposits is generally called the "mass unbalance" of the system. This phenomenon is well known in the art (see for instance "Air Purification in the Reversing Exchanger," W. E. Lobo et al., Chemical Engineering Progress, vol. 43, No. 2, pages 69–73, February 1947). Various methods have been proposed and used heretofore to accomplish this unbalance and with it an efficient operation of the regenerators or other types of heat exchangers for chilling the incoming air to fractionation temperatures and effecting its purification. It is of importance that the method employed be such as will permit efficient separation of the chilled air in subsequent fractionating equipment, with high recovery of the oxygen component in relatively pure form.

One of the methods known to the prior art involves by-passing a small proportion (of the order of 2–6%) of the inlet air stream around the regenerators in order to achieve the unbalance, chemically purifying this side stream to remove $CO_2$, expanding through a work-engine a stream of gaseous $N_2$ withdrawn from the top of the high pressure (5–6 atms.) feed tower of the conventional double tower fractionation system, to develop some of the necessary refrigeration, and introducing additional refrigeration through the small air stream which by-passes the regenerators, by means of a very high level of compression (150–200 atms.) and through auxiliary refrigeration of this stream with evaporating ammonia. The refrigeration requirements of the process represent basically the heat leak into the system and the difference in heat content between the entering air and the product $O_2$ and $N_2$ streams leaving the process.

In this method the by-pass air stream represents a substantial item of investment and operating cost because of its high pressure level and the need for separate chemical purification facilities for this stream, as by scrubbing with NaOH solution. $CO_2$ cannot be removed easily from high pressure air by chilling, since the air liquefies before the $CO_2$ is deposited on the chilling surface. Various attempts have been made, therefore, to eliminate this stream, utilizing concepts and techniques which have developed during the last five years.

In general, the trend of these efforts has been toward the development of a completely low pressure (i. e., 5–7 atms.) process, in which the unbalance required for satisfactory vaporization of the $CO_2$ deposited on chilling the incoming air is obtained not by the expedient of by-passing a small portion of the entering air around the chilling and purification means, but rather by recycling a small cold gas stream through the chilling means through a path which is physically separated from but in thermal contact with the paths of the inlet air and product gas streams. The by-pass air stream is thus completely eliminated, the air previously introduced in this manner being included in the main air stream entering the process.

The prospects of accomplishing such a completely low pressure process have been considerably improved by the recent development of more efficient gas expansion turbines and of process flow schemes allowing the expansion of a larger quantity of gas than has been the case in previous operations. This permits the generation of the necessary refrigeration for the process entirely by means of the work-expansion of a process gas stream, and it is no longer necessary to compress a small portion of the incoming air to high pressure levels and to provide for auxiliary refrigeration and chemical purification of this stream. Systems of this type are discussed in "Chemical Engineering Progress" vol. 43, No. 1, pages 21–26 (January, 1947) and vol. 43, No. 2, pages 61-90 (February, 1947).

While the use of low pressures throughout is a desirable development both technically and economically, the provision of a separate flow path for internally recycling unbalance gas, which is thermally bonded to the flow path for the incoming air stream, is not completely satisfactory from an economic viewpoint. It is this feature which permits the elimination of the requirement for introducing a small portion of the inlet air through a separate flow path whivh by-passes the regenerators and therefore requires separate purification and chilling facilities. The scheme of unbalancing by recycle of cold gas through a separate flow path which is thermally bonded to the main flow path may be applied to heat exchange means using either the regenrative or the recuperative scheme of heat transfer, but in all cases a very substantial increase in cost of the principal heat exchange means relative to simple regenerators is encountered.

In the case of regenerators designed with the inclusion of separate flow paths for recycle unbalance, the increased cost results from the limited cross-sectional area across which the thermal effect of the unbalance flow can be made effective. It is necessary to design such regenerator units for large air separation plants in the form of a large number of chambers of limited diameter (e. g. one foot) arranged for parallel flow of the gas streams therethrough, whereas by constructing a regenerator unit using by-pass unbalance rather than recycle unbalance, the regenerators can be greatly increased in diameter (e. g. to 9 feet) with a corresponding saving in cost of shells, valves, headers, etc.

In the case of heat transfer means using the recuperative principle, usually termed simply heat exchangers, methods have been devised permitting these to be constructed with provision for recycle unbalance flow passages and without the limitations in diameter which are inherent in the construction of similarly unbalanced regenerators. However, it has not been possible to duplicate the large heat transfer surface, low pressure drop, and relatively low inactive volume characteristic of the conventional simple regenerators, and costs of fabricating such exchangers are high in relation to the conventional simple regenerators.

Accordingly it appears that the lowest investment cost for a large scale oxygen plant will be obtained by a combination process utilizing conventional-type simple regenerators with air by-pass unbalance, combined with a process flow which will enable the by-pass air stream to be introduced at the pressure of the main air stream or at a lower pressure. The present invention is directed to a combination process of this type which avoids the difficulties outlined above and which affords various additional advantages as will be apparent from the subsequent detailed description wherein reference will be made to the accompanying drawings, in which Figure 1 illustrates schematically a system suitable to carry out a preferred embodiment of the invention; and Figure 2 and Figure 3 illustrate certain modifications of this system in which a portion of a cold product gas is used for chilling the by-pass unbalance stream.

Broadly speaking, the present invention involves the diversion of a small portion of the main air supply as an unbalance stream by-passing the principal air chilling and purification means such as alternating regenerators and/or recuperators, chilling and purifying the unbalance stream to remove at least the principal portion of its $CO_2$ and $H_2O$ contents in equipment separate from the principal heat exchange means and at a pressure not substantially exceeding that of the main stream, and utilizing the heat removed from the unbalance air stream to adjust the temperature of a portion of chilled and purified process gas which is then subjected to work expansion to provide the refrigeration requirements of the process. In this manner, the invention may utilize the low cost and demonstrated operability of conventional-type simple regenerative cold accumulators, while simultaneously eliminating external low temperature refrigeration means and separate compression of the unbalance stream, and reducing the latter to the minimum flow necessary for successful operation of the principal air chilling and purification means. More specific features and advantages of the invention will appear hereinafter.

Referring now to the drawings, the system illustrated therein will be described first as to Figure 1 using as an example the separation of 100 unit volumes of air into oxygen and nitrogen. An amount of slightly more than 100 unit volumes, say about 100.2 unit volumes, of air is supplied through line 1 to compressor 3 wherein it may be compressed to a moderate pressure of the order of 5–7 atms. abs. For reasons of simplicity there has not been included at this point the small quantity of additional air which must be supplied at the same pressure level to make up for the losses which are experienced when a conventional-type simple cold accumulator or regenerator filled with air under pressure is switched to connect with the product gas lines, at which time at least a portion of the air under pressure in the regenerator is generally vented to the atmosphere. The air required to make up for these losses may amount to an additional 3 to 6%.

The air compressed in compressor 3 is preferably cooled to about 100° F. by indirect heat exchange with water which may take place in an after-cooler forming a part of the compressor unit 3 in a manner known per se. The air leaving compressor unit 3 may then be further cooled to about +60° F. in a conventional "forecooler" 5 by direct contact with a circulating stream of water which has been previously cooled to a temperature of about 50° to 60° F., preferably by direct contact with the $N_2$ product gas stream. This step reduces the load on the main heat exchange equipment comprising conventional regenerator units 10 and 12 and also provides for a steadier operation of these regenerators by substantially reducing the water content of the entering air.

A major portion, say about 96–98 volumes, of the air cooled in forecooler 5 is then supplied through line 7 and chilled to about −275° F. by heat exchange in the conventional-type simple alternating cold accumulators or regenerator units 10 or 12 with a total of 100 volumes of oxygen and nitrogen supplied to the regenerators in separate streams from conventional double fractionation column 60, as will appear more clearly hereinafter. Regenerator pairs 10 and 12 are preferably of the so-called "ribbon packed" type. The cold storage medium in these cold accumulators is normally made by winding corrugated aluminum strip (about 25 mm. wide and 0.5 mm. thick) into a coil in a manner similar to the winding of a movie reel. A series of these coils commonly called "pancakes" are placed on top of each other in the accumulator vessel. Duplicate alternating accumulators of this type are used for heat exchange of incoming air with product nitrogen on the one hand and of incoming air with product oxygen on the other hand. The incoming air and the product $N_2$ or $O_2$ streams are switched from one to the other of a pair of accumulators at approximately 3 minute intervals.

The regenerator pairs 10 and 12 comprise, therefore, a relatively large regenerator pair 10 for accumulating the cold of the nitrogen product stream and a relatively small regenerator pair 12 for accumulating the cold of the oxygen product stream. The feed air is divided between the air-nitrogen accumulators on the one hand and the air-oxygen accumulators on the other hand in proportion to the heat capacity of the two product streams. It will be observed that the total quantity of air supplied to regenerator units 10 and 12 is smaller than the total quantity of returned product gases. This difference in gas quantities represents the unbalance required for the successful operation of the regenerators with respect to complete revaporization, during the cold-storing cycles, of the ice and $CO_2$ snow deposited from the air during the air chilling cycles. Nitrogen is supplied to regenerator units 10 and 12 through lines 14 and 16, respectively, and oxygen through lines 18 and 20, respectively.

The remaining small portion of the inlet air, amounting to about 2.2 to 4.2 volumes, which has not been supplied to the regenerator units 10 and 12 may be passed through line 25 to a cooling unit 27 wherein it may be cooled somewhat below the "forecooling" temperature, say to about 30° to 50° F., in indirect heat exchange with evaporating ammonia, if desired, to reduce the load on the subsequent water removal equipment. The condensed water may be drawn off and the air having now a temperature of about 40° F. may be passed through line 29 to a system of alternating air driers 30 and 32 which may contain a suitable water absorbent such as silica gel, alumina gel, charcoal etc. The bulk of the water vapor remaining in the air stream is removed in driers 30 or 32 leaving only a very small water content corresponding to a dew point of about −25° F. The air is heated by the heat of adsorption of the water to a temperature level of about 70° F. These preliminary drying steps are not essential however. The unbalance air stream is then passed through line 33 to a system of 2 alternating heat exchangers 35 and 37 of the recuperative-type for a removal of the $CO_2$ and residual water contents of this air side stream in the following manner.

The $CO_2$ remaining water contents of the unbalance air stream is deposited in alternating exchangers 35 and 37 by means of chilling in heat exchange with an equivalent quantity of cold purified air withdrawn from the main air stream leaving regenerators 10 and 12 through line 40 at a temperature of, say, about −275° F. A chilled clean air stream amount to about 18 volumes is branched-off line 40 through line 42. An amount of about 2.2 to 4.2 volumes of this air (in general an amount substantially equal to the quantity of unbalance air stream) is supplied through lines 44 or 45 to exchangers 35 or 37 to chill the air supplied thereto through line 33 to a temperature of −265° to −275° F., at which temperature water and $CO_2$ are essentially completely deposited in these exchangers. A close approach of the air chilling temperature to the temperature of the air in line 42 may be made possible by the provision of adequate exchanger surface. In general, the closer this approach the higher will be the degree of purification from $CO_2$. If the unbalance by-pass air stream in line 33 has been freed of the bulk of its water content in absorbers 30 or 32, the chilling cycles of exchangers 35 and 37 may be of considerable duration extending over about 3–5 hours or more without appreciable plugging of the unbalance air flow path or any marked decrease in heat transfer rate being experienced.

Assuming exchanger 35 on a chilling cycle and exchanger 37 on a cleaning (ice and $CO_2$ vaporization) cycle, the operation of these exchangers is as follows. The small portion of the clean, cold, main air stream supplied through lines 42 and 44 to exchanger 35 is warmed during the chilling cycle of exchanger 35 in heat exchange with the air supplied through line 33 to a temperature of about +60° F. This warmed air stream leaves exchanger 35 through line 47. A small proportion of the air in line 47 corresponding in amount to the slight excess of air compressed in compressor 3 over air separated in column 60, that is about 0.2 volume, is passed through line 49 to exchanger 37. Line 49 is provided with a throttle valve 48 by means of which the pressure may be reduced to substantially atmospheric pressure. On its way through exchanger 37 this gas first passes through the clean passageways of exchanger 37, i. e. the passageways through which the clean air stream from line 42 rather than the unbalance air stream containing $CO_2$ and residual water was passed during the chilling cycle. It is then inverted and passed back through the fouled passageways, i. e. the passageways in which the $CO_2$ and residual ice of the unbalance air stream are deposited during the chilling cycle to be eventually vented through line 51 to the atmosphere. By this procedure the clean gas in line 49 is first chilled by the cold stored in exchanger 37 without depositing impurities, since it is itself clean, and is then warmed while passing in a reverse direction over fouled surface. The vaporizable deposits saturate the cleaning stream and are thus slowly removed from the exchanger surface. This type of flow is employed primarily in order to reduce the quantity of heat introduced into the exchanger 37 in the process of cleaning; it is much more effective in this regard than for example directing the clean warm stream of cleaning air into the cold end of the exchanger. The rate of cleaning may be increased by supplying a small amount of heat corresponding to a temperature rise of about 5° to 10° F. prior to inverting the cleaning air stream by means of a heater 53 or by by-passing a small part of the warm cleaning air stream from line 49 around exchanger 37 to the opposite cold end, thereby raising slightly the temperature of the stream entering the fouled passageway. This procedure may be desirable in many cases in spite of the somewhat increased refrigeration load resulting therefrom.

Returning now to the warmed clean air stream in line 47, the major portion of this stream, say about 2–4 volumes, is passed through line 46 to be admixed with the remaining portion of cold purified air, amounting to about 14–16 volumes, which was withdrawn from line 40 through line 42 and not used for chilling and purifying the unbalance air. The chilled purified unbalance air stream exiting from exchanger 35 via line 57 is also mixed with the other purified air streams from lines 46 and 55. The mixed stream in line 56 which may amount to about 20 volumes and which may have a temperature of about $-235°$ to $-245°$ F. is directed to a high efficiency turbine expander 59, such as described in the publications referred to above, wherein it is expanded to slightly above atmospheric pressure and supplied to the upper low pressure section of tower 60 through line 61 at a temperature of about $-300°$ F. The mixing of the water of the warm air-stream from line 46 with the cold air streams from lines 56 and 57 in the manner described results in an increase in the temperature of the air entering expanders 59, to a level such that liquefaction of any significant amount of the gas stream during expansion is avoided. This is desired because of the loss in efficiency resulting from liquefaction taking place during expansion. The efficiency of expanders 59 should be high, say about 80%, and the quantity of gas passed to the expanders should be so controlled that the refrigeration required by system is provided thereby. For example, by expanding approximately 20% of the process air from an initial condition of $-236°$ F. and 6 atms. pressure to a final pressure of 1.35 atms. with 80% adiabatic efficiency, a refrigeration effect amounting to about 2.7 B. t. u./lb. of air processed is obtained. This is sufficient to provide the refrigeration requirement of the process when operated on a large scale. The expanders operate at a discharge pressure corresponding to the pressure level of the low pressure section 63 of tower 60 so that the expanded gases in line 61 may vent directly into that section where they undergo fractionation.

The operation of double fractionation tower 60 comprising a low pressure secion 63, a high pressure section 65 and auxiliary heat exchange equipment is conventional throughout and need not be described in full detail for the purpose of the present invention. Briefly it may be stated that the tower 69 effects fractionation without the introduction of external heating or cooling. The elevated pressure of, say about 60–80 lbs. per sq. in. gauge under which high pressure section 65 may be operated raises the boiling points of the components of the air supplied through line 41 to the bottom of section 65 to a level such that the heat of the $N_2$ condensing in the top of section 65 may be used to reboil liquid $O_2$ in the bottom of low pressure section 63. Reboiler heat transfer in exchanger 67 is limited to the quantity required to condense all the air introduced through line 41. A relatively small number of plates in section 65 is sufficient to effect separation into a pure liquid $N_2$ stream withdrawn through line 69 to be employed for top reflux in the top of section 63 and an oxygen enriched bottoms fraction withdrawn through line 71 to be used as the liquid feed stream for section 63. The latter stream may be passed through porous filters 73 to remove solid $CO_2$ entrained from the regenerators before it is vented into section 63. It may also pass through a bed of silica gel 74 employed to reduce the quantity of acetylene or other light hydrocarbons introduced into the tower. Filter 73 and bed 74 may be regenerated at intervals. Both the liquid bottoms fraction and the liquid $N_2$ withdrawn from section 65 through line 69 are preferably subcooled in heat exchangers 81 and 77 by heat exchange with gaseous product $N_2$ withdrawn through line 79 from the top of tower section 63 to reduce vaporization loss on throttling. The nitrogen stream in line 69 is vented into the top of column section 63 as previously described to provide the necessary reflux.

Column section 63 preferably operates under a pressure of about 3 to 8 p. s. i. gauge, only sufficient to overcome friction losses in the product discharge lines. The oxygen-containing feed streams to tower section 63 comprise the liquid oxygen-enriched bottoms product of tower section 65 and the cold gaseous air leaving the expander 59 through line 61. The amount of reflux available is generally barely sufficient to effect the separation of these streams into oxygen and nitrogen of fairly high purity so that a relatively large number of plates operating with high efficiency is normally required. Since argon is also present in air as a third component, special means for argon removal may be provided if both the oxygen and nitrogen products must be of very high purity. This is not contemplated in the example here described, where an oxygen purity of about 95% is satisfactory. The $N_2$ taken through line 79 as an overhead gaseous product is employed to subcool the reflux $N_2$ in line 69 by means of heat exchanger 77 and is then passed preferably to further heat exchange with the liquid feed stream to tower 63 in heat exchanger 81. It may then be passed through exchanger 83 for final temperature adjustment before entering regenerator units 10 as previously described to cool and purify the incoming air. All or a portion of the N₂ leaving regenerators 10 through line 85 may finally be employed to cool the water used in air fore-cooler 5. Gaseous product oxygen is withdrawn from the bottom of tower section 63 through line 78. It may be adjusted in temperature by passage through exchanger 82 before entering regenerator units 12 as previously described to cool and purify the incoming air. Product O₂ is withdrawn through line 86.

The foregoing description has referred to a specific method for achieving an entirely low pressure process for air separation employing mass unbalance to permit long-continued operation of alternating regenerative-type equipment used as the principal air chilling and purifying means, in which the small stream of air bypassed around the principal air chilling means to effect the desired mass unbalance is chilled and purified in separate chilling means, and in which the heat abstracted from the stream of unbalance air is employed to preheat a portion of purified air which is expanded in a work engine to provide the refrigeration necessary for the process and then fractionated for the production of a stream comprising principally oxygen. Certain modifications of the procedure disclosed are self-evident and it is not intended to disclaim such modifications. For example, instead of employing a portion of the main air stream to chill the unbalance stream, a portion of the product N₂ stream leaving the low pressure tower may equally well be employed for the same purpose. The heat transferred to the N₂ stream may then be transferred in separate heat exchange means to the air stream passing to the expander, with a total result similar to that obtained in the procedure specifically described. An advantage may be gained in this manner in that the by-pass stream may be cooled to a lower temperature and hence may be more completely purified.

An operation of this type is illustrated in the attached Figure 2. This drawing includes a partial showing of the heat exchange and fractionating equipment of Figure 1 in which similar parts are similarly numbered and a different manifolding system is shown. According to this modification of the invention, a portion of the main air stream 40, derived from the regenerators 10 and 12 of Figure 1, is withdrawn as a side stream through line 142 and used for work expansion in expander 59. The by-pass stream 33 of predried air introduced into the exchanger system 35 and 37 is cooled by heat exchange with a stream of cold product nitrogen withdrawn from line 79 by way of 143. The cooling gas introduced into lines 44 and 45 by way of line 143 is thus nitrogen instead of air, and the connection of line 42 to line 44 in Figure 1 is eliminated. The internal manifolding and operating cycle for this exchanger system, for alternately cleansing the surface of one exchanger while the other is on stream in the chilling-purifying stage of the cycle, are otherwise quite similar to those in Figure 1. A fractional percentage of nitrogen fouled by use as a cleansing gas in this way is bled off through line 51, and a substantially larger stream of nitrogen warmed by the exchange of heat in chilling and purifying the by-pass air stream is withdrawn through line 146.

The chilled and purified air from the by-pass stream, withdrawn through line 157, is combined with the portion of the main cold air stream withdrawn through line 142. Before passing this combined stream to the work expander 59, however, it is prewarmed by indirect heat exchange in heat exchanger 150 with the warm nitrogen stream in line 146. The nitrogen stream thus recooled is returned to line 79 by way of line 147. The prewarmed air stream 156, derived from lines 142 and 157, is then chilled by work expansion in expander 59 and passed through line 61 into the middle portion of the low pressure section 63 of fractionating tower 60. The function of the regenerators and fractionating towers is otherwise essentially the same in this modification of the invention as in that illustrated in Figure 1.

Another possible modification within the spirit of the invention involves the feed of all of the chilled and purified air, both the main stream and the unbalance stream to the bottom of the high pressure tower section, and the withdrawal from the top of this tower section of a gaseous stream of N₂ at the elevated tower pressure of about 60–80 p. s. i. gauge. This stream may amount to about 20 volume per cent on the air feed. A portion of this cold N₂ stream may then be used to chill and purify the unbalance air stream in the manner previously described. The heated portion of this N₂ stream may then be mixed with the remaining cold gaseous N₂ to provide a prewarmed N₂ stream under pressure for expansion in the work engine to generate the refrigeration load of the process. The expanded N₂ may be discharged in admixture with the low pressure gaseous product N₂ leaving the top of the low pressure tower section.

This modification of the invention is illustrated in the attached Figure 3. This drawing likewise includes a partial showing of the heat exchange and fractionating equipment of Figure 1, with similar parts similarly numbered and a different monifolding system. In this modification a portion of the high pressure nitrogen available within exchanger 67 at the top of the high pressure section 65 of fractionating tower 60 is withdrawn through line 267. A portion of the high pressure nitrogen in this stream is branched off and fed through line 243 to lines 44 and 45, at a rate controlled by valve 245, to chill the by-pass air stream 33 in the exchangers 35 and 37.

In this case, chilled and purified air produced in the by-pass exchanger system is withdrawn through line 257 and combined with the main cold air stream 40, derived from the main air regenerators 10 and 12 of Figure 1. The total combined air stream thus produced is cooled further by exchangers 82 and 83 and passed through line 241 into the bottom of the high pressure section 65 of tower 60.

The high pressure nitrogen stream 246 is warmed in the same manner as N₂ stream 146 in Figure 2 or air stream 46 in Figure 1, by heat exchange with the by-pass air stream in condensers 35 and 37. Here, however, it is combined with and pre-warms the remaining portion of the cold high-pressure nitrogen from line 267, in line 256. The prewarmed nitrogen stream in line 256, work expanded in expander 259, is rechilled thereby and passes through line 261 to line 79 leaving the top of the low pressure section 63 of the fractionating tower. The cooling effect of the work expansion step is thus available for heat exchange in exchangers 77 and 81, in substantially the same manner as in the modification shown in Figure 1.

While the foregoing description has referred to the principal air chilling means as being of the alternaitng regenerative type, they may equally suitably be of the alternating recuperative type. The invention may be applied in a generally analogous manner to the separation of other low boiling gas mixtures into two components of different boiling point. The lower boiling component then takes the place of $N_2$ while the higher boiling component takes that of oxygen. Other modifications within the spirit of the invention may appear to those skilled in the art.

The above description and exemplary operations have served to illustrate specific embodiments of the invention but are not intended to be limiting in scope.

What is claimed is:

1. The method of separating gas mixtures by liquefaction and fractionation which comprises charging the major proportion of a gas mixture to be separated at a super-atmospheric pressure to chilling and purification means to produce cold clean gas, chilling and purifying a minor proportion of said gas mixture in equipment separate from said means at substantially said super-atmospheric pressure so as to cool said minor proportion and remove at least the major proportion of its solidifying constituents, said separate equipment comprising heat exchange means operating by the recuperative principle in chilling cycles and cycles serving the evaporation of solidified gas mixture constituents deposited in said recuperative means, passing a minor proportion of said first named cold clean gas through said recuperative means during their chilling cycle to warm said minor proportion of cold clean gas, passing a minor proportion of said clean gas so warmed through said recuperative means during said cleaning cycle to remove said deposits, mixing the remaining portion of said warmed clean gas with a second minor proportion of said first named cold clean gas, subjecting the mixture so obtained to work expansion to provide refrigeration and utilizing said refrigeration in said process.

2. The process of claim 1 in which said first-named minor proportion is withdrawn from said recuperative means at a temperature closely approaching that of said first-mentioned cold clean gas and admixed with said remaining portion of said warmed clean gas prior to said work expansion.

3. The process of claim 1 in which said minor proportion of said warmed clean gas is first chilled by passage through said recuperative means from the warm end to the cold end during the cleaning cycle, employing a flow path free of deposited vaporizable impurities and is then reversed and passed through said recuperative means from the cold end to the warm end through a flow path initially containing deposited vaporizable impurities.

4. The process of claim 3 in which external heat is added to said minor portion of said warmed clean gas after chilling and before its reversal and reintroduction into the said recuperative means.

5. The process of claim 3 in which a small stream is branched off said minor proportion of said warmed clean gas and by-passed around said recuperative means, and said by-passed stream is then added to the chilled portion of said warmed clean gas before its reversal and reintroduction into the said recuperative means.

6. The process of claim 1 in which said gas mixture is air and said chilling and purification means are cooled by passing therethrough separate streams of cold product nitrogen and oxygen gases.

7. The process of claim 6 in which said separate streams carry a total quantity of gas larger than that of said major proportion of air.

8. The method of separating a gas mixture by liquefaction and fractionation which comprises charging the major portion of the gas mixture at a superatmospheric pressure to chilling and purification means to produce a first stream of cold clean gas by means of heat exchange with separate streams of cold clean gas representing separated product constituents the total quantity of which is larger than the quantity of said major portion of the gas mixture, chilling and purifying the remaining minor portion of said gas mixture at substantially said superatmospheric pressure in equipment separate from said means so as to cool said minor portion and remove at least the major part of its solidifying constituents, said separate equipment comprising heat exchange means operating by the recuperative principle in chilling cycles and cycles serving the evaporation of solidified gas constituents deposited therein, passing through said recuperative means during their chilling cycle a relatively small amount of a second clean gas stream derived from one of said streams of cold clean gas to warm said second clean gas stream, passing a minor portion of said second clean gas so warmed through said recuperative means during their cleaning cycle to remove the deposits therefrom, transferring heat absorbed from said first named minor portion of the gas mixture to a third cold clean gas stream derived from one of said streams of cold clean gas maintained at superatmospheric pressure, subjecting the warmed gas in the last named stream to work-expansion to provide refrigeration and utilizing said refrigeration in said process.

9. The method of claim 8 in which said second cold clean gas stream is a minor portion of said first stream of cold clean gas, said third cold clean gas stream is a separate minor portion of said first cold clean gas stream, and said heat transfer is effected by adding the remaining warmed portion of said second clean gas stream directly to said third stream prior to said work expansion.

10. The method of claim 9 in which said gas mixture is air, said second cold clean gas stream is a chilled portion of said air and said third cold clean gas stream is another chilled portion of said air.

11. The method of claim 8 in which said second cold clean gas stream is a portion of a cold separated main gas constituent, said third cold clean gas stream is a chilled portion of said gas mixture, and said heat transfer is effected by the indirect exchange of heat between said third stream and at least part of the warmed portion of said second stream.

12. The method of claim 11 in which said gas mixture is air, said second cold clean gas stream is a portion of a cold separated main constituent of air and said third cold clean gas stream is a chilled portion of said air.

13. The method of claim 8 in which said second cold clean gas stream is a portion of a cold separated main gas constituent, said third cold clean gas stream is another portion of a cold separated main gas constituent, and said heat transfer is effected by adding the remaining warmed portion of said second clean gas stream directly to said third stream prior to said work expansion.

14. The method of claim 13 in which said gas mixture is air, said second cold clean gas stream is a portion of cold separated nitrogen and said third cold clean gas stream is another portion of cold separated nitrogen.

HENRY J. OGORZALY.

REFERENCES CITED

The following references are of record in the file of this patent:

UNITED STATES PATENTS

| Number | Name | Date |
|---|---|---|
| 2,334,632 | Koehler | Nov. 16, 1913 |
| 2,433,604 | Dennis | Dec. 30, 1947 |
| 2,496,380 | Crawford | Feb. 7, 1950 |
| 2,504,051 | Scheibel | Apr. 11, 1950 |
| 2,513,306 | Garbo | July 4, 1950 |
| 2,526,996 | Crawford | Oct. 24, 1950 |
| 2,579,498 | Jenny | Dec. 25, 1951 |

OTHER REFERENCES

Chemical Engineering, March 1947, Air Separation, pp. 126–134, Figure 14.